(12) United States Patent
Van Giel et al.

(10) Patent No.: US 10,477,777 B2
(45) Date of Patent: Nov. 19, 2019

(54) AGRO- AND GEOTEXTILES

(71) Applicant: Beaulieu International Group NV, Waregem (BE)

(72) Inventors: Frans Van Giel, Kortrijk (BE); Christophe Dominique René Haegeman, Ternat (BE); Veronique Caroline Berthe Brossé, Gavere (BE)

(73) Assignee: Beaulieu International Group NV, Waregem (BE)

( * ) Notice: Subject to any disclaimer, the term of this patent is extended or adjusted under 35 U.S.C. 154(b) by 0 days.

(21) Appl. No.: 15/758,040

(22) PCT Filed: Sep. 7, 2016

(86) PCT No.: PCT/EP2016/071072
§ 371 (c)(1),
(2) Date: Mar. 7, 2018

(87) PCT Pub. No.: WO2017/042207
PCT Pub. Date: Mar. 16, 2017

(65) Prior Publication Data
US 2018/0242530 A1    Aug. 30, 2018

(30) Foreign Application Priority Data
Sep. 7, 2015  (EP) .................................. 15184127

(51) Int. Cl.
*A01G 7/04*     (2006.01)
*A01G 13/02*    (2006.01)
(Continued)

(52) U.S. Cl.
CPC ......... *A01G 7/045* (2013.01); *A01G 13/0275* (2013.01); *B32B 5/022* (2013.01);
(Continued)

(58) Field of Classification Search
CPC .. A01G 7/045; A01G 13/0275; A01G 9/1438; A01G 13/0231; A01G 2009/1453;
(Continued)

(56) References Cited

U.S. PATENT DOCUMENTS 3,975,859 A * 8/1976 Muller ............... A01G 13/0231
                                                             47/31
5,048,228 A * 9/1991 Neveu .................. A01G 9/1438
                                                             47/9
(Continued)

FOREIGN PATENT DOCUMENTS

GB         2396252 A       6/2004
WO    2008129118 A1      10/2008
(Continued)

*Primary Examiner* — Joseph L Williams
*Assistant Examiner* — Jose M Diaz
(74) *Attorney, Agent, or Firm* — James Creighton Wray

(57) ABSTRACT

The invention pertains to an agro- or geotextile (1), comprising: i) a carrier (2); and ii) an electric network (3) of one or more lighting units (4, 18), whereby said electric network (3) of one or more lighting units (4, 18) is provided on a surface of said carrier (2). The invention further pertains to a method for producing an agro- or geotextile (1) and to a use of an agro- or geotextile (1) according to the current invention.

23 Claims, 4 Drawing Sheets

(51) Int. Cl.
*B32B 5/02* (2006.01)
*B32B 5/26* (2006.01)
*D03D 1/00* (2006.01)
*D03D 15/00* (2006.01)
*D04H 1/56* (2006.01)
*E01C 17/00* (2006.01)
*E02B 3/12* (2006.01)
*E02D 17/20* (2006.01)
*F21V 19/00* (2006.01)
*F21V 21/14* (2006.01)
*F21Y 105/12* (2016.01)
*F21Y 115/15* (2016.01)

(52) U.S. Cl.
CPC ............... *B32B 5/028* (2013.01); *B32B 5/26* (2013.01); *D03D 1/00* (2013.01); *D03D 15/0088* (2013.01); *D04H 1/56* (2013.01); *E01C 17/00* (2013.01); *E02B 3/122* (2013.01); *E02D 17/202* (2013.01); *F21V 19/0015* (2013.01); *F21V 21/14* (2013.01); *B32B 2250/02* (2013.01); *B32B 2250/20* (2013.01); *B32B 2307/422* (2013.01); *B32B 2410/00* (2013.01); *D03D 2700/014* (2013.01); *D03D 2700/0166* (2013.01); *D10B 2321/022* (2013.01); *D10B 2401/20* (2013.01); *D10B 2505/204* (2013.01); *E02D 2300/009* (2013.01); *E02D 2300/0087* (2013.01); *F21Y 2105/12* (2016.08); *F21Y 2115/15* (2016.08)

(58) Field of Classification Search
CPC ............... D03D 15/0088; D03D 1/00; D03D 2700/014; D03D 2700/0166; E01C 17/00; E02D 17/202; E02D 2300/0087; E02D 2300/009; E02B 3/122; D04H 1/56; F21V 21/14; F21V 19/0015; F21Y 2105/12; F21Y 2115/15; B32B 2250/02; B32B 2307/422; B32B 2410/00; B32B 2250/20; B32B 5/022; B32B 5/26; B32B 5/028; D10B 2505/204; D10B 2321/022; D10B 2401/20; Y02P 60/146; Y02A 40/252
See application file for complete search history.

(56) References Cited

U.S. PATENT DOCUMENTS

| | | | |
|---|---|---|---|
| 2003/0211797 | A1 | 11/2003 | Hill |
| 2010/0013406 | A1* | 1/2010 | Bhattacharya ....... D03D 1/0088 315/291 |
| 2011/0088314 | A1 | 4/2011 | Jacobs |
| 2012/0327651 | A1* | 12/2012 | Cornelssen ............. F21S 8/033 362/231 |
| 2014/0241817 | A1* | 8/2014 | Jones ...................... D03D 9/00 405/302.7 |
| 2017/0037636 | A1* | 2/2017 | Bishop ................... B32B 5/024 |
| 2018/0163945 | A1* | 6/2018 | Horter ...................... F21V 3/06 |
| 2018/0295894 | A1* | 10/2018 | Yue ..................... H05B 33/0827 |
| 2018/0310644 | A1* | 11/2018 | Poupyrev ............... A41D 1/005 |
| 2018/0320332 | A1* | 11/2018 | Booth .................... E01C 7/325 |

FOREIGN PATENT DOCUMENTS

| | | |
|---|---|---|
| WO | 2011036617 A1 | 3/2011 |
| WO | 2011092620 A1 | 8/2011 |

\* cited by examiner

AGRO- AND GEOTEXTILES

TECHNICAL FIELD

The invention pertains to agro- and geotextiles applicable in at least one of the fields of civil engineering, agriculture or landscape preservation.

BACKGROUND

Fabrics of the type agro-textile or geo-textile, hereinafter called agro- and geotextiles, are known in the art and have a multitude of applications in various technical fields. For example, in the field of civil engineering, such as in roads, airfields, railroads, embankments, retaining structures, reservoirs, canals, dams, bank protection; in the field of coastal engineering to control erosion of shorelines; and in the fields of agriculture and landscape preservation, for purposes including moisture retention, water conservation, weed or sward suppression, soil warmth retention, and for light reflection.

In some applications, the incorporation of lighting in agro- and geotextiles could be desirable, for example in horticultural applications for promoting crop growth or crop colouring, for the illumination of or to provide information onto/next to roads, airfields or railroads, or for landscaping purposes.

US 2011/0088314 discloses an agro- or geotextile type product with integrated lighting. In particular, US 2011/0088314 relates to a shading device for a greenhouse, with a shading element and at least one lighting element, wherein the shading element comprises an outer side and an inner side, the shading element is formed from interwoven electrically conductive first thread elements and electrically insulating second thread elements, the first thread element comprises a reflective means, reflecting an ambient light, the lighting element is arranged at the inner side of the shading element and connected with the first thread element, and the lighting element is driven by an electrical current, conducted by the first thread element, resulting in the emission of an artificial light, illuminating a plant growing in the greenhouse.

US 2011/0088314 has the problem that cutting such a shading element in pieces will result in loss of operable electric connections for a large portion of the lighting elements. This is a hurdle for on-site dimensioning of such a shading element, which is an important issue when regarding the variable dimensions of greenhouses or similar constructions in agro- or geotextile applications.

The invention aims to resolve at least some of the problems mentioned above.

SUMMARY

In a first aspect, the present invention concerns an agro- or geotextile, comprising:
 i) a carrier; and
 ii) an electric network of one or more lighting units,
whereby said electric network of one or more lighting units is provided on a surface of said carrier.

Providing the lighting units on a surface of the carrier enables the lighting units to emit light in an undisturbed fashion. Furthermore, the heat generated by the lighting units can easily be dissipated to the environment, thereby avoiding overheating of the agro- or geotextile.

In a second aspect, the present invention concerns a method for producing an agro- or geotextile comprising a carrier and one or more lighting units, comprising the steps of:
 i) providing an electric network of lighting units; and
 ii) providing a carrier for said electric network,
whereby said carrier is provided on a surface of said electric network.

According to this method, the electric network will be strengthened on a surface by the provided carrier, while the lighting units can emit light undisturbedly at the opposite surface of the electric network. In this way, an agro- or geotextile with excellent structural stability and lighting characteristics is produced.

In a third aspect, the present invention concerns an agro- or geotextile according to the first aspect of the invention for stimulating crop growth, for fruit colouring, for fruit culture, for horticulture, for greenhouse light control, for the illumination of or to provide information onto/next to roads, airfields or railroads, or for landscaping purposes.

DETAILED DESCRIPTION OF THE INVENTION

Figure 1:
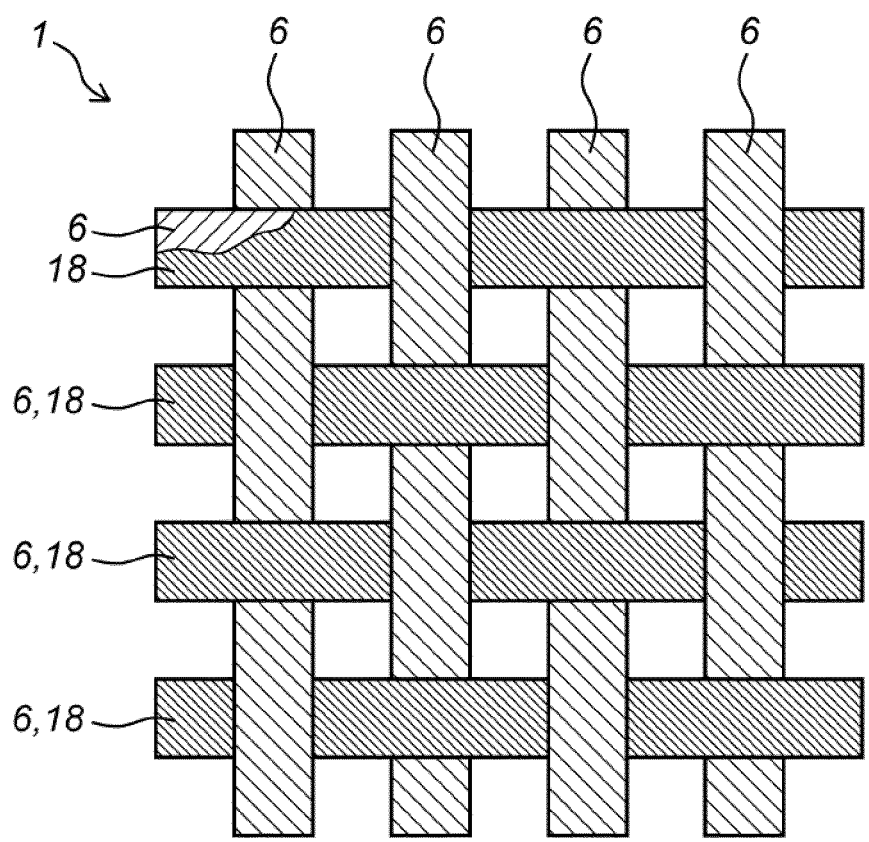
FIG. 1 shows a woven fabric comprising OLED 18 printed tapes 6, according to embodiments of the present invention.

As used herein, the following terms have the following meanings:

The term "woven fabric", as used herein, refers to any material obtained by weaving, knitting or other such techniques wherein the matrix consists of a lattice work or web of thread-like elements or tapes which are generally, uniformly oriented such as might be the case in certain felts. The woven fabric can comprise a thermoplastic material, a thermosetting material, a fabric reinforced thermosetting material, a fabric reinforced thermoplastic material, a mixed thermoplastic/thermosetting material or various combinations of the above. Numerous other materials can be used in a woven fabric, such as for example, cotton, fiberglass, wool, silk, linen, rayon, and the like. Furthermore, blends of various materials such as cotton-polyester woven fabrics, rayon-polyester woven fabrics, etc. may also be employed.

The term "tapes", as used herein, is to be interpreted as elongated elements comprising a band like form.

The term "thermoplastic material", as used herein, applies to a polymeric material that becomes pliable or moldable above a specific temperature and substantially solidifies upon cooling. Examples of thermoplastic polymers include, but are not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like.

The term "thermosetting material", as used herein, applies to those materials, generally, but not always, synthetic in nature, which solidify or set on heating and cannot readily be re-melted. Non-limiting examples of such thermosetting materials or resins include phenolics, alkyds, amino resins, polyesters, epoxies, silicones and the like.

The term "nonwoven fabric", as used herein, refers to a web or mat of filaments that are bonded, fused, interlocked, or otherwise joined. As an example, a nonwoven fabric may be formed by randomly depositing a plurality of polymer filaments upon a surface, such as a moving conveyor. Various embossing or calendaring processes may also be utilized to ensure that the nonwoven fabric has a substantially constant thickness, impart texture to one or both surfaces of the nonwoven fabric, or further bond or fuse filaments within the nonwoven fabric to each other. Whereas spunbonded nonwoven fabrics are formed from filaments having a cross-sectional thickness of 10 to 100 microns, meltblown nonwoven fabrics are formed from filaments having a cross-sectional thickness of less than 10 microns.

The nonwoven fabric may be a spunbond nonwoven fabric. A spunbond nonwoven fabric is preferred above other nonwoven fabrics, such as, for example, needle-punched nonwoven fabrics, since a spunbond nonwoven fabric possesses high material strength. Preferably, the nonwoven fabric is comprised of two synthetic materials, whereby the two synthetic materials have a different melting point. The different polymers, where the nonwoven fabric is made from, exist either in separate filaments or together in one filament. It would therefore be possible that the nonwoven fabric comprises two filament types. The two filament types are predominantly made from different polymers with different melting points, so-called bifilament types. The term "predominantly" as used herein means at least 90%. It is preferred that the melting points of the two different polymers differ by at least 10° C. More preferably the melting points differ by at least 50° C. Such a product could also be thermally bonded by subjecting the nonwoven fabric product to a temperature in the range of the melting point of the polymer with the lower melting point. However, this nonwoven fabric product would not be bonded at each crossing point since fibres comprising the polymer with the higher melting point might cross each other. Only crossing points of fibres in a combinetion high and low melting point or low and low melting point would be bonded and not the crossing points of fibres with high melting point. A nonwoven fabric made from bicomponent filaments is therefore preferred. The bicomponent filaments of the nonwoven fabric carrier are thermally bonded. Bicomponent filaments are filaments of two polymers of different chemical construction. A basic distinction is being drawn between three types: side by side types, sheath core types and matrix/fibril types.

The nonwoven fabric may comprise sheath core type bicomponent filaments. Such a sheath-core type bicomponent nonwoven fabric possesses a core which acts as a backbone with the sheath being the bonding medium of the backbone. The structure of such a product becomes very stable because the filaments are bonded at each crossing point of the filaments thus creating a nonwoven fabric with the highest quantity of bonding points. The dimensional stability of the nonwoven fabric can be made regular over the length and width by optimising the filament distribution. This structure gives enough resistance to the high local impregnation pressure needed for obtaining a smooth impregnated surface over the full width. The great number of bonding points provides a stable nonwoven fabric already at low area unit weights while leaving enough open space for penetration of an impregnating material through the nonwoven fabric, which ensures good mechanical bonding. The sheath-core type bicomponent nonwoven fabric possesses a uniform stability. The properties of the described sheath-core type bicomponent nonwoven fabric make possible a stable processing at low weight and thickness. Preferably, the sheath-core type bicomponent nonwoven fabric comprises a core consisting mainly of polyester and a sheath consisting mainly of polyamide. Alternatively, the sheath consists mainly of polyamide 6 and the core consists mainly of polyethylene terephthalate. Preferably the sheath/core ratio lies between 95/5 volume percent and 5/95 volume percent. More preferably the sheath/core ratio lies between 50/50 volume percent and 5/95 volume percent. The nonwoven fabric preferably has a basis weight of 50 gsm to 2500 gsm. More preferably, the nonwoven fabric has a basis weight of 65 gsm to 1000 gsm. Even more preferably, the nonwoven fabric has a basis weight of 70 gsm to 350 gsm. Most preferably, the nonwoven fabric has a basis weight of 75 to 180 gsm. A basis weight of the nonwoven fabric between these limits ensures that the nonwoven fabric is open enough for penetration of an impregnating material, ensuring good mechanical bonding. A higher basis weight can be selected for the nonwoven fabric when high rigidity is desired while a lower basis weight results in more flexible and more economical materials.

The term "plastic film", as used herein, refers to a plastic sheet, laminate, web or the like or combinations thereof, having one dimension which is significantly smaller than the other two dimensions, and having two major surfaces with a thickness there between. A plastic film can be a monolayer film, having only one layer, or a multilayer film, having two or more layers. The plastic film can comprise one or more polymers selected from the group comprising: polyamide, polyethylene, polypropylene, polymethyl methacrylate, polystyrene, polyvinyl cyclohexane, polyvinyl cyclohexane copolymers, acrylonitrile/butadiene/styrene copolymers, polyvinyl chloride and polycarbonate.

In a first aspect, the present invention concerns an agro- or geotextile, comprising:
  i) a carrier; and
  ii) an electric network of one or more lighting units,
whereby said electric network of one or more lighting units is provided on a surface of said carrier.

As mentioned above, agro- and geotextiles include fabrics for use in the field of civil engineering, such as in roads, airfields, railroads, embankments, retaining structures, reservoirs, canals, dams, bank protection; in the field of coastal engineering to control erosion of shorelines; and in the fields of agriculture and landscape preservation, for purposes including moisture retention, water conservation, weed or sward suppression, soil warmth retention, and for light reflection. Agro- and geotextiles are however not to be confined to fabrics, since plastic alternatives, such as plastic films, can as well be used for the mentioned applications.

In some applications, it could be desirable to incorporate lighting in agro- and geotextiles, for example in horticultural applications for promoting crop growth or crop colouring, for the illumination of or to provide information onto/next to roads, airfields or railroads, or for landscaping purposes.

The carrier functions to provide a carrying structure for the electric network of one or more lighting units. In different embodiments, the carrier may be a woven fabric, a nonwoven fabric or a plastic film.

According to embodiments the lighting units are LEDs, organic LEDs (OLEDs), dielectric barrier discharge lamps, gas discharge lamps, high intensity discharge lamps, incandescent lamps, fluorescent lamps or high pressure sodium lamps. Depending on the intensity and wavelength spectrum of light which is desired for a specific application, a selection can be made among these types of lighting units.

Providing the lighting units on a surface of the carrier enables the lighting units to emit light in an undisturbed fashion. Furthermore, the heat generated by the lighting units can easily be dissipated to the environment, thereby avoiding overheating of the agro- or geotextile.

In a preferred embodiment, two or more lighting units are provided on a surface of said carrier. The lighting units can be connected randomly, yet can also be connected in a structured fashion. The lighting units within the electric network may be electrically connected in series or may be electrically connected in parallel. Additionally, a part of the lighting units may be electrically connected in series, while another part of the lighting units is connected in parallel.

The agro- or geotextile may span an area of for instance 0.5-400 m², such as 2-400 m². The number of lighting units per m² may for instance be in the order of 1-40, such as 4-10, though there may be agro- and geotextiles with more or even with less lighting units per square meter. Note that the distribution of the lighting units, over the agro- or geotextile, may be uniform or may vary in different areas in the agro- or geotextile. In embodiments, the agro- or geotextile comprises n×m lighting units, wherein n is at least 4, and m is at least 4. In embodiments, the lighting units are configured to provide light in one direction, e.g. light emanating from one side of an agro- or geotextile. This may for instance be of interest for top lighting applications. In other embodiments, the lighting units are configured to provide light in two substantially opposite directions, e.g. light emanating from two sides of a agro- or geotextile. This may for instance be of interest for inter-lighting applications. In still other embodiments, the lighting units are configured to provide light in multiple directions.

In another preferred embodiment, the lighting device comprises two or more subsets of lighting units. In this way, each set of lighting units can be selected for reasons of light intensity or wavelength of light, in order to provide a supply of light which is tailored towards specific lightening needs. The subsets may have lighting units arranged in an elongated shape with subsets arranged parallel. For instance, two or more subsets of lighting points may be provided as elongated subsets, like in the form of rows of lighting units. In this way, an agro- or geotextile may be provided wherein strips may provide light with different spectral distributions. In principle, also non-symmetric arrangements of the lighting units in a subset or of the pluralities of subsets in the agro- or geotextile may be possible. The two or more subsets may be independently controllable. An advantage of multiple subsets is that dedicated parts of an object that is to be illuminated, such as, for example, a horticulture crop or horticulture arrangement may be illuminated with a "high" spatial resolution. With about the same resolution, a certain wavelength or certain wavelengths of the light may be selected and provided at the right position. Hence, the agro- or geotextile in an embodiment may comprise "colour pixels", that can be switched on and off, by which the spectral intensity distribution of the emitted light can be varied, e.g. as a function of one or more of the addressed part of the object which is to be illuminated, the time of the day, the light intensity and light distribution of ambient light. In this text, the term "ambient light" at least covers sunlight, synthetic light emitted by an illumination device other than the lightening units, and reflected light. For horticultural applications, the spectral density distribution can additionally be varied as a function of the type of crop, the growth stage of the crop, the stage of a fruit, the time to harvest, the time from harvest, and position in horticulture arrangement.

In the present text, the term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs).

In embodiments of agro- and geotextiles that are applied for horticultural applications, the wavelength range of the light emitted by the lighting units is chosen to be 400-800 nm, which includes the photosynthetically active radiation region. In the field of application of light in horticulture, intensity is counted in photons, and each photon in the indicated ranges counts equally in photosynthetic activity. As below 400 nm also relevant plant processes may take place, in further specific embodiments the wavelength range is chosen to be 300-800 nm.

In a preferred embodiment, said lighting units of said agro- or geotextile have a size of less than 30 mm, more preferably less than 15 mm, even more preferable less than 10, and most preferably less than 5 mm, so that the lighting units do not hinder the ease in which the agro- or geoxtextile can be rolled up on a roll for transport.

In a preferred embodiment, the present invention provides an agro- or geotextile according to the first aspect of the invention, whereby said carrier is a woven fabric, a nonwoven fabric or a plastic film.

According to the specific needs of an agro- or geotextile towards a specific application, a woven fabric, a nonwoven fabric, a plastic film, or a combination thereof, can be selected as the carrier of the agro- or geotextile.

A woven fabric shows excellent durability, stretchability and water resistance properties. A woven fabric possesses warp threads and weft threads. By interweaving the weft threads with the warp threads to form the woven fabric, the fabric provides light diffusion, for the purpose of positively influencing the regular growth of fruits with improved colouring and ripening for horticultural applications. In a preferred embodiment, said woven fabric comprises one or more of tapes. Incorporating tapes in said woven fabric results in a coarse meshed woven fabric. Such tapes have the advantage that they are easy to produce. In a preferred embodiment, said tapes may be specifically used as warp threads for the woven fabric. In an even more preferred embodiment, said tapes are provided with lighting units and are used as warp threads for the woven fabric.

Unlike woven fabrics, nonwoven fabrics require no weaving or knitting operations to be produced. This is advantageous for embodiments wherein fibres, threads or tapes provided with lighting units are used as basis materials to produce a nonwoven fabric, since there is virtually no risk of damaging the lighting units during the production process.

The main advantage of using a plastic film as a carrier is that such films can be provided in a great variety of shapes, materials, degrees of rigidity, etc.

In a preferred embodiment, the present invention provides an agro- or geotextile according to the first aspect of the invention, whereby said carrier has a reflectivity of at least 10%, and more preferably of at least 25%, as measured according to ASTM E 1918.

Said reflectivity is expressed as the percentage of sunlight in the UV-VIS spectrum which can be reflected by the agro- or geotextile, as measured according to ASTM E 1918. Providing light which is reflected by agro- and geotextiles possessing said amounts of reflectivity is a convenient and economical light source in addition to light emitted by the lighting units. An agro- or geotextile which is able to reflect sunlight is for example very well suited as a ground covering in horticultural applications. Additionally, said carrier can be used to direct the reflected light from the sun or lighting units in one or more preferred directions. The required amount of reflectivity can be achieved by providing the carrier with a reflective means. The reflective means may be a foil like element, preferably connected with the carrier. The connection may be done through different methods, as for example by gluing or welding the foil like reflective means to a surface. Apart from this merging, the reflective means may be produced by thin film deposition or coating techniques, such as ion beam deposition, electron beam deposition or chemical vapour deposition. In a preferred embodiment, the reflective means comprises a thickness of between 10 µm and 800 µm, more preferably between 20 µm and 500 µm, even more preferably between 30 µm and 250 µm, yet even more preferably between 40 µm and 200 µm, yet even more preferably between 50 µm and 175 µm, and most preferably between 75 µm and 125 µm. In an embodiment, the carrier of the agro- or geotextile is a woven fabric which includes foil like tapes as part of the fabric. This is convenient to produce as no gluing or welding is needed. Furthermore, such kind of foil like element often possesses an enhanced mechanical stability, which is useful to produce an agro- or geotextile with a large size. In another embodiment, the reflective means is a white paint based on particles such as $TiO_2$. In yet another embodiment, the reflective means is a metal film. In still another embodiment, the carrier of the agro- or geotextile is a plastic film and light scattering particles, such as $TiO_2$, are incorporated in the film. In another embodiment, the carrier of the agro- or geotextile is a woven fabric which includes monofilaments or tapes, wherein light scattering particles, such as $TiO_2$, are incorporated in said monofilaments or tapes.

In a preferred embodiment, the present invention provides an agro- or geotextile according to the first aspect of the invention, whereby at least a portion, multiple portions or substantially the entirety of said carrier is translucent.

This is particularly of interest for embodiments where the agro- or geotextile is applied as a covering for crops, e.g. for the protection of the crops against wind or rain, while it is desired that the sunlight can still reach the crops.

In a preferred embodiment, the present invention provides an agro- or geotextile according to the first aspect of the invention, whereby said carrier comprises a UV resistant agent.

UV is an environmental stressor for plants. Therefore, in horticultural applications, it is desired to protect plants or crops against UV. In embodiments of the invention, the carrier comprises a UV resistant agent which is selected from the group of carbon black, phenols, amines or mixtures thereof.

In a preferred embodiment, the present invention provides an agro- or geotextile according to the first aspect of the invention, whereby said electric network is a two-dimensional electric grid.

With a two-dimensional electric grid it is meant that each anode of each lighting unit within the electric network is at least electrically connected to two or more cathodes of neighbouring lighting units and that each cathode of each lighting unit within the electric network is at least electrically connected to two or more anodes of neighbouring lighting units. Such a two-dimensional electric grid has the advantage that one can cut into the electric grid without losing the electrical connectivity for most of the lighting units. This possibility of cutting the agro- and geotextiles on site without losing a substantial amount of operable lighting units is highly desirable, since agro- and geotextiles are applied for a high variety of outside applications that rely on environmental structures with highly variable dimensions. For example, an agro- or geotextile used as a ground covering in horticulture should be dimensioned with respect to the topography of the soil and with respect to the dimensions and position of the plants or crops. In a preferred embodiment, the agro- and geotextiles comprising said two-dimensional electric grids are produced in large dimensions and provided to a user in rolls, after which the user can cut the rolls on site.

In a preferred embodiment, the present invention provides an agro- or geotextile according to the first aspect of the invention, whereby said lighting units comprise one or more LEDs.

In embodiments, the light emitting diodes (LEDs) are solid state LEDs. In other embodiments, the LEDs are OLEDs. Also combinations of solid state LEDs and OLEDs may be applied.

The advent of solid state lighting based on LEDs offers opportunities for application in horticulture and other fields. The main advantages of using LEDs in horticulture result from the possibility to control the spectral composition of the light to closely match the plant's photoreceptors' sensitivity. Together with additional benefits like improved heat control and freedom of distributing the LEDs across a horticulture application area, this provides a more optimal production and enables influencing the plant's morphology and composition. It also promises a reduced energy consumption (and associated cost). It is evident that the benefits of LEDs related to heat control, freedom of distribution an reduced energy consumption are also valid for applications of agro- and geotextiles other than horticultural applications, such as, for example, in the field of civil engineering, such as in roads, airfields, railroads, embankments, retaining structures, reservoirs, canals, dams, bank protection; in the field of coastal engineering to control erosion of shorelines. Solid state LEDs are easily integrated into digital control systems, facilitating lighting programs such as "daily light integral" lighting and sunrise and sunset simulations. LEDs are safer to operate than current lamps because they do not have glass envelopes and do not contain mercury. One or more LEDs may comprise converter material(s), such as one or more of an inorganic dye and an organic dye, for at least partially converting the LED light into light having another wavelength. For LED lighting in horticulture, mainly blue LEDs (450 nm) and red LEDs (625-675 nm) are to be used. Instead of blue LEDs also white LEDs may be used. Alternatively, in addition to one or more of blue and red LEDs, white emitting LEDs may be applied. LEDs emitting in the green part of the spectrum are much less efficient for horticultural applications.

In a preferred embodiment, said lighting units comprise one or more OLEDs. The advantage of an OLED is that it is a homogeneous large area light source with potentially low cost and high efficiency and hence, OLEDs are better suited for horticultural and other applications where the total cost of ownership is important. These OLEDs utilize current flowing through a thin-film of organic material to generate light. The colour of light being emitted and the efficiency of the energy conversion from current to light are determined by the composition of the organic thin-film material. However, the OLEDs comprise a substrate material as a carrier layer, which may be made of glass or an organic material or from non transmittive materials such as metal foils. Furthermore, organic light emitting diodes consist of at least one very thin layer with a layer thickness of approx. 5-500 nm of organic substances on a glass substrate covered with an electrically conducting and optically transparent oxide. This conducting layer usually is performed as Indium-Tin-Oxide (ITO). Usually the ITO-layer forms the anode and a layer of aluminium forms the cathode, whereas the aluminium layer features a thickness of approx. 100 nm and thus a thickness like the ITO-layer. Aluminium of such a thickness works as a mirror, such that the emission is through the transparent ITO anode and the transparent substrate only. If the cathode metal is thin enough to be partially transparent, part of the light can also be emitted through the cathode. In an embodiment, an optical transparent or translucent OLED is provided by selecting other appropriate materials as cathode. In a preferred embodiment, OLEDs are selected that are UV-curable.

In a preferred embodiment, the invention provides an agro- or geotextile, whereby said carrier comprises one or more tapes with LEDs. The LEDs are preferably affixed on a surface of said one or more tapes. In the configuration of a woven fabric, the tapes with LEDs can be provided uni-directionally. The carrier can comprise multiple types of tapes, such as tapes with LEDs and tapes without LEDs. In a more preferred embodiment, said carrier comprises one or more tapes with OLEDs, and even more preferably with printed OLEDs, such as e.g. digitally printed UV-curable OLEDs. Such tapes are preferred since they are easily obtainable using existing processing techniques.

In a preferred embodiment, the invention provides an agro- or geotextile, whereby a protective layer is provided onto said electric network. Such a protective layer provides protection to the electric network with lighting units against light, i.e. UV-light, water and incident damages, thus improving durability of the agro- or geotextile. The protective layer can be a woven fabric, a nonwoven fabric or a polymeric film. Preferably, the protective layer is at least partially translucent and/or water-impermeable. In a further or alternative embodiment, a protective layer can also be provided onto the surface of the carrier facing opposite from said electric network. Such a protective layer may likewise provide water resistance, (UV-)light resistance and/or resistance to incident damages.

In a second aspect, the present invention concerns a method for producing an agro- or geotextile comprising a carrier and one or more lighting units, comprising the steps of:
i) providing an electric network of lighting units; and
ii) providing a carrier for said electric network,
whereby said carrier is provided on a surface of said electric network.

According to this method, the electric network will be strengthened on a surface by the provided carrier, while the lighting units can emit light undisturbedly at the opposite surface of the electric network. In this way, an agro- or geotextile with excellent structural stability and lighting characteristics is produced.

In a preferred embodiment, the present invention provides a method according to the second aspect of the invention, whereby said carrier is a woven fabric and said electric network is woven into said carrier.

This preferred embodiment can be used to produce a woven fabric comprising lighting units on one side. The lighting units comprise preferably LEDS, and more preferably OLEDs.

In a preferred embodiment, the present invention provides a method according to the second aspect of the invention, whereby said carrier is obtained by dispersing fibres onto a surface of said electric network.

This preferred embodiment can be used to produce a nonwoven fabric comprising lighting units on one side. The lighting units comprise preferably LEDS, and more preferably OLEDs.

In a preferred embodiment, the present invention provides a method according to the second aspect of the invention, whereby a coating is applied onto a surface of said electric network.

This preferred embodiment can be used to produce a film comprising lighting units on one side. The lighting units comprise preferably LEDS, and more preferably OLEDs.

In a third aspect, the present invention concerns an agro- or geotextile according to the first aspect of the invention for stimulating crop growth, for fruit colouring, for fruit culture, for horticulture, for greenhouse light control, for the illumination of or to provide information onto/next to roads, airfields or railroads, or for landscaping purposes.

EXAMPLES

Example 1

Figure 2A:
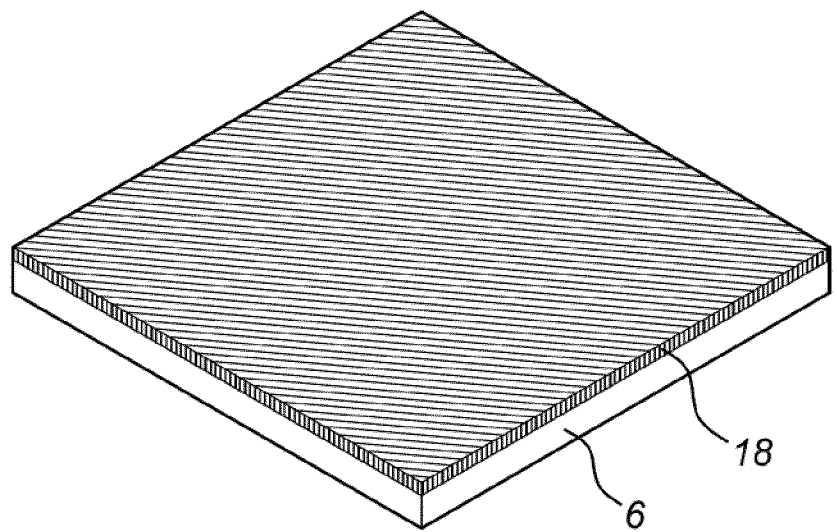
FIGS. 2A-2B depict perspective views of OLED 18 printed tapes 6, according to embodiments of the present invention.
Figure 2B:
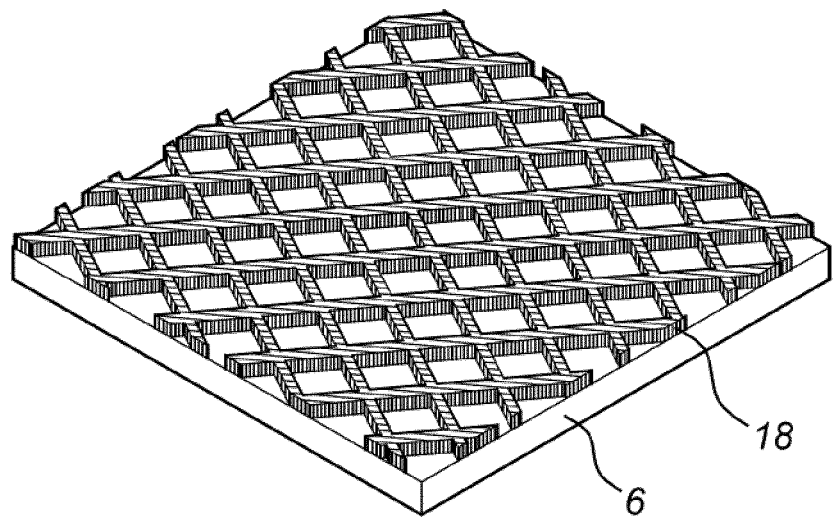

A preferred embodiment relates to a woven fabric comprising OLED printed tapes. A schematic representation of the woven fabric is presented in FIG. 1. FIGS. 2A and 2B each show a detail of an OLED printed tape.

In this embodiment a polypropylene tape 6 comprising a UV resistant agent and optionally one or more colouring agents is printed on one side of the tape 6 with a UV curable OLED 18 using a digital printing device. The UV curable OLED ink can be provided onto the entire surface of said polypropylene tape 6 (FIG. 2A) or can be printed in the form of a continuous pattern of printed OLED 18 (FIG. 2B). The continuous pattern allows the electrical connection across the tape 6 without the need for excessive ink. In addition, providing i.e. a zigzag pattern of OLED 18 improves the flexibility of the printed OLED 18 tape 6, which is advantageous with regard to the robustness of the agro- or geotextile 1.

When the OLED 18 printed tapes 6 are cured, said polypropylene tapes 6 can be used as warps for weaving a woven fabric. In one preferred embodiment, said OLED warps 6, 18 are used in combination with non-OLED warps 6. According to the envisioned application and the light intensity requirements, the amount of OLED 18 tapes 6 can easily be optimised. The non-OLED warps 6 can either be regular yarns, such as polypropylene yarns, or can be tapes.

The woven fabric can thus be easily provided on a roll and can be transported effectively to a location for use. On location, the fabric may be cut to match environmental needs. Finally, the OLED 18 tapes 6 may be connected with an electric source and controlling means for controlling the activity of the OLEDs 18.

Example 2

Figure 3:
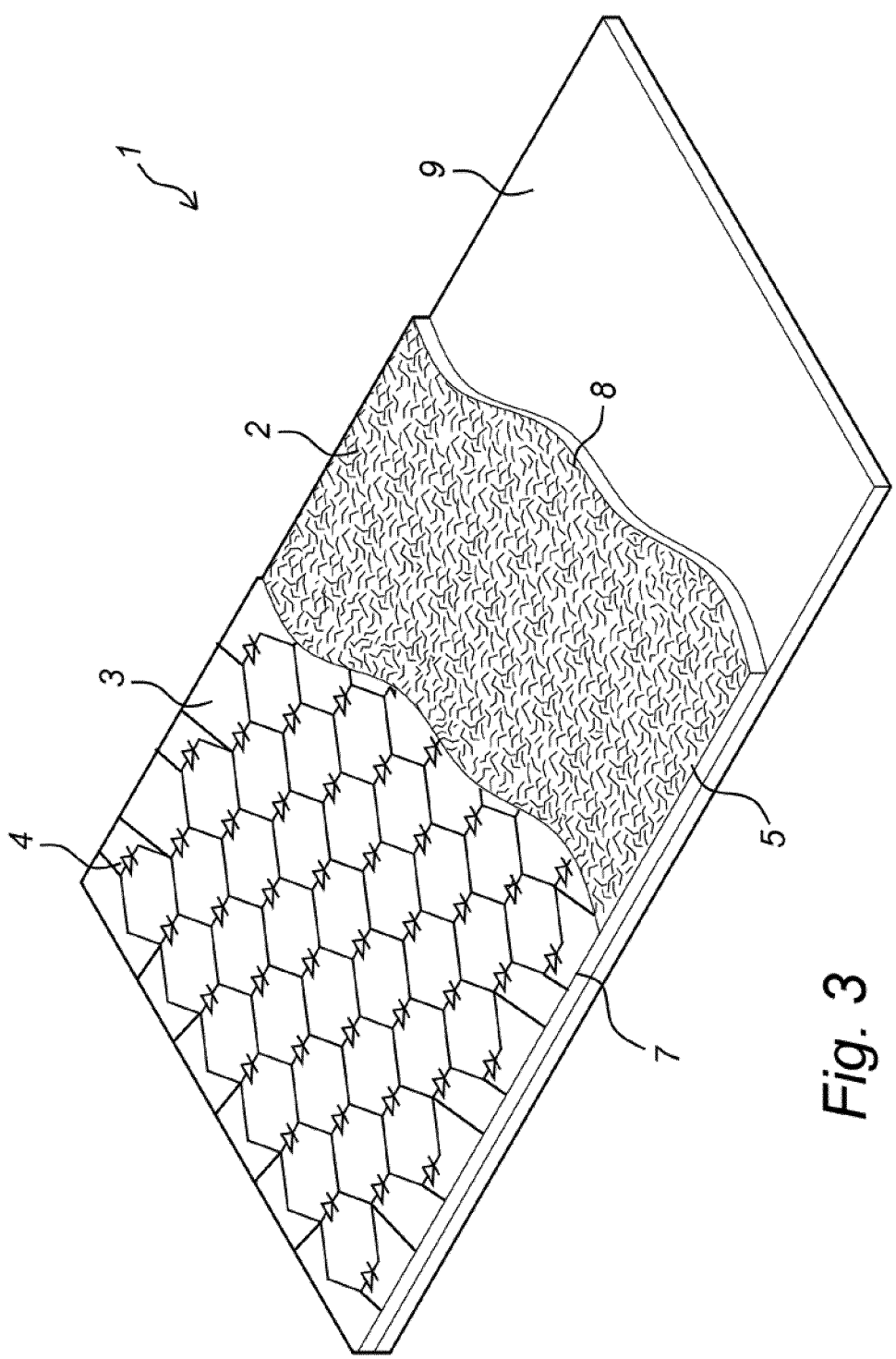
FIG. 3 shows a nonwoven fabric comprising a plurality of LEDs 4, according to embodiments of the present invention.

In a preferred embodiment, a plurality of LEDs 4 are jointly connected to form an electric network in the form of an electric grid 3, i.e. each anode is connected to at least two anodes of two separate, neighbouring LEDs 4 and each cathode is connected to at least two cathodes of two separate, neighbouring LEDs 4 (FIG. 3). Such an electric grid 3 allows a user to make a partial cut through the network without disrupting the electric connectivity of one or more LEDs 4.

Next, the electric grid 3 of LEDs 4 is spread out in order to optimise the distribution of LEDs 4 over a surface. Then, spunlaid fibres 8 are provided onto a surface 7 of said electric grid 3 and cooled to a temperature significantly below the melt temperature. As a result, a nonwoven fabric comprising a plurality of electrically connected LEDs 4 is obtained. The nonwoven fabric functions as a carrier 2 of the electric grid 3, with a surface 5 of the carrier 2 contacting said surface 7 of said electric grid 3. Characteristics of said nonwoven fabric can easily be directed by manipulating process parameters of the manufacturing process. Optionally, one side of the nonwoven fabric may be provided with a light reflecting layer 9 to direct the light from the LEDs 4 in a preferred direction.

In one embodiment, the LEDs 4 may be oriented to face away from the electric grid 3 and are temporarily fixed in that position before being provided with said spunlaid fibres 8. In one preferred embodiment, each LED 8 is fixed equidistant with respect to its neighbouring LEDs 4 before being provided with said spunlaid fibres 8.

Example 3

Figure 4:
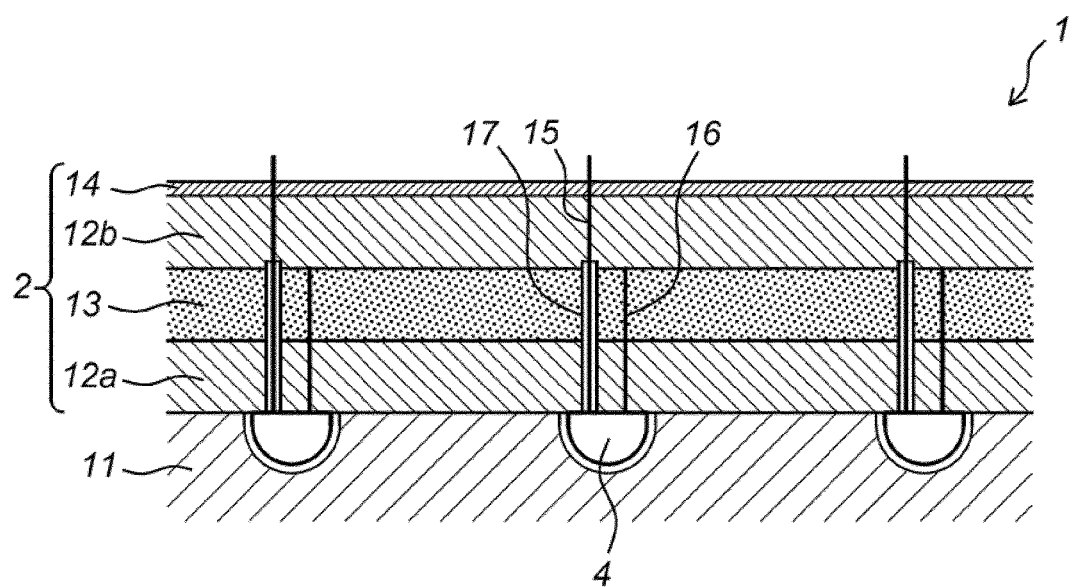
FIG. 4 shows a plastic film comprising a plurality of LEDs 4, according to embodiments of the present invention.

This example relates to an embodiment of a plastic film comprising a plurality of LEDs 4. A schematic representation of the plastic film is presented in FIG. 4.

In this embodiment a plurality of LEDs 4 are temporarily positioned in a matrix, such as a mould 11, with the anodes 15 and cathodes 16 facing up. Said anodes 15 and cathodes 16 are provided with different lengths, respectively; i.e., the cathodes 16 are shorter than the anodes 15. The LEDs 4 are affixed within the matrix 11 so as to form a closed surface. Onto said closed surface, a first non-conductive polymer paste 12a is provided and allowed to solidify through cooling and/or curing. The polymer paste 12a is provided in a thickness, whereby said anodes 15 and said cathodes 16 extend from the polymer paste 12a. Next, a digital printer prints an electrically conductive ink 13 to connect the ends of said cathodes 16 to form a two-dimensional grid of connected cathodes 16. As a result, said cathodes 16 are electrically connected. Electrical connection of the anodes 15 at this stage is avoided by providing the anodes 15 locally with an isolating covering 17. Optionally, said digital printer may print a décor onto said first non-conductive polymer 12a before printing said electrically conductive ink 13.

Subsequently, a second non-conductive polymer paste 12b is provided on top of said grid of cathodes 16 and allowed to solidify. The second non-conductive polymer 12b covers the grid of cathodes 16 but the anodes 15 extend from said second non-conductive polymer 12b. Then, an electrically conductive ink is printed on the top surface of the second non-conductive polymer 12b to connect the ends of said anodes 15 to form a two-dimensional grid of electrically connected anodes 15. Instead of an electrically conductive ink to connect the plurality of anodes 15, a metal film 14 may be applied on top of the second non-conductive polymer 12b to provide electric conductivity as well as reflectance of light.

Finally, an additional coating may be provided on the top surface to provide additional functionality such as durability and mechanical strength.

The invention claimed is:

1. Apparatus comprising:
an agro- or geotextile (1),
wherein the agro- or geotextile further comprises:
   i) a carrier (2); and
   ii) an electric network (3) of one or more lighting units (4, 18),
wherein said electric network (3) of one or more lighting units (4, 18) is provided on a surface (5) of said carrier (2).

2. The apparatus of claim 1, whereby said carrier (2) has a reflectivity of at least 10%, as measured according to ASTM E 1918.

3. The apparatus of claim 1, whereby at least a portion, multiple portions or substantially the entirety of said carrier (2) is translucent.

4. The apparatus of claim 1, whereby said carrier (2) comprises a UV resistant agent.

5. The apparatus of claim 1, whereby said electric network (3) is a two-dimensional electric grid.

6. The apparatus of claim 1, whereby said lighting units (4, 18) comprise one or more LEDs (4).

7. The apparatus of claim 1, whereby said carrier (2) is a woven fabric, a nonwoven fabric or a plastic film.

8. The apparatus of claim 1, whereby said carrier (2) comprises one or more tapes (6) with LEDs (18), preferably with printed OLEDs (18).

9. The apparatus of claim 1, whereby a protective layer is provided onto said electric network (3).

10. Method for producing an agro- or geotextile (1) comprising
providing the agro- or geotextile,
providing the agro- or geotextile with a carrier (2) and one or more lighting units (4, 18), comprising the steps of:
   i) providing an electric network (3) of lighting units; and
   ii) providing a carrier (2) for said electric network (3),
   wherein said carrier (2) is provided on a surface (7) of said electric network (3).

11. Method according to claim 10, whereby said carrier (2) is a woven fabric and said electric network (3) is woven into said carrier (2).

12. Method according to claim 10, whereby said carrier (2) is obtained by dispersing fibres (8) onto a surface (7) of said electric network (3).

13. Method according to claim 10, whereby a coating is applied onto a surface (7) of said electric network (3).

14. The agro- or geotextile (1) according to claim 1, wherein the agro- or geotextile includes the carrier (2) and the one or more lighting units (4, 18) adapted for stimulating crop growth, for fruit colouring, for fruit culture, for horticulture, for greenhouse light control, for the illumination of or to provide information onto/next to roads, airfields or railroads, or for landscaping purposes.

15. The apparatus of claim 8, whereby said carrier (2) comprises one or more tapes (6) with printed OLEDs (18).

16. The apparatus of claim 1, further comprising a reflector for reflecting light.

17. The apparatus of claim 16, wherein said reflector directs reflected light from sunlight or the lighting units in one or more preferred directions.

18. The apparatus of claim 16, wherein the reflector is a thin film formed by ion beam deposition, electron beam deposition or chemical vapour deposition.

19. The apparatus of claim 18, wherein the thin film comprises a thickness selected from the group consisting of between 10 μm and 800 μm, between 20 μm and 500 μm, between 30 μm and 250 μm, between 40 μm and 200 μm, between 50 μm and 175 μm, between 75 μm and 125 μm, and combinations thereof.

20. The apparatus of claim 16, wherein the reflector is selected from the group consisting of foil-type element, white paint based including TiO2 particles, metal film, and combinations thereof.

21. The apparatus of claim 1, wherein the agro- or geotextile is a woven fabric comprising foil like tapes.

22. The apparatus of claim 1, wherein the carrier a plastic film comprising light scattering TiO2 particles.

23. The apparatus of claim 1, wherein the carrier is a woven fabric including monofilaments or tapes, and wherein light scattering TiO2 particles are incorporated in said monofilaments or tapes.

* * * * *